W. R. McKEEN, Jr.
STEEL CAR CONSTRUCTION.
APPLICATION FILED NOV. 9, 1909.

1,189,148.

Patented June 27, 1916.
7 SHEETS—SHEET 1.

WITNESSES:

INVENTOR

BY

ATTORNEYS

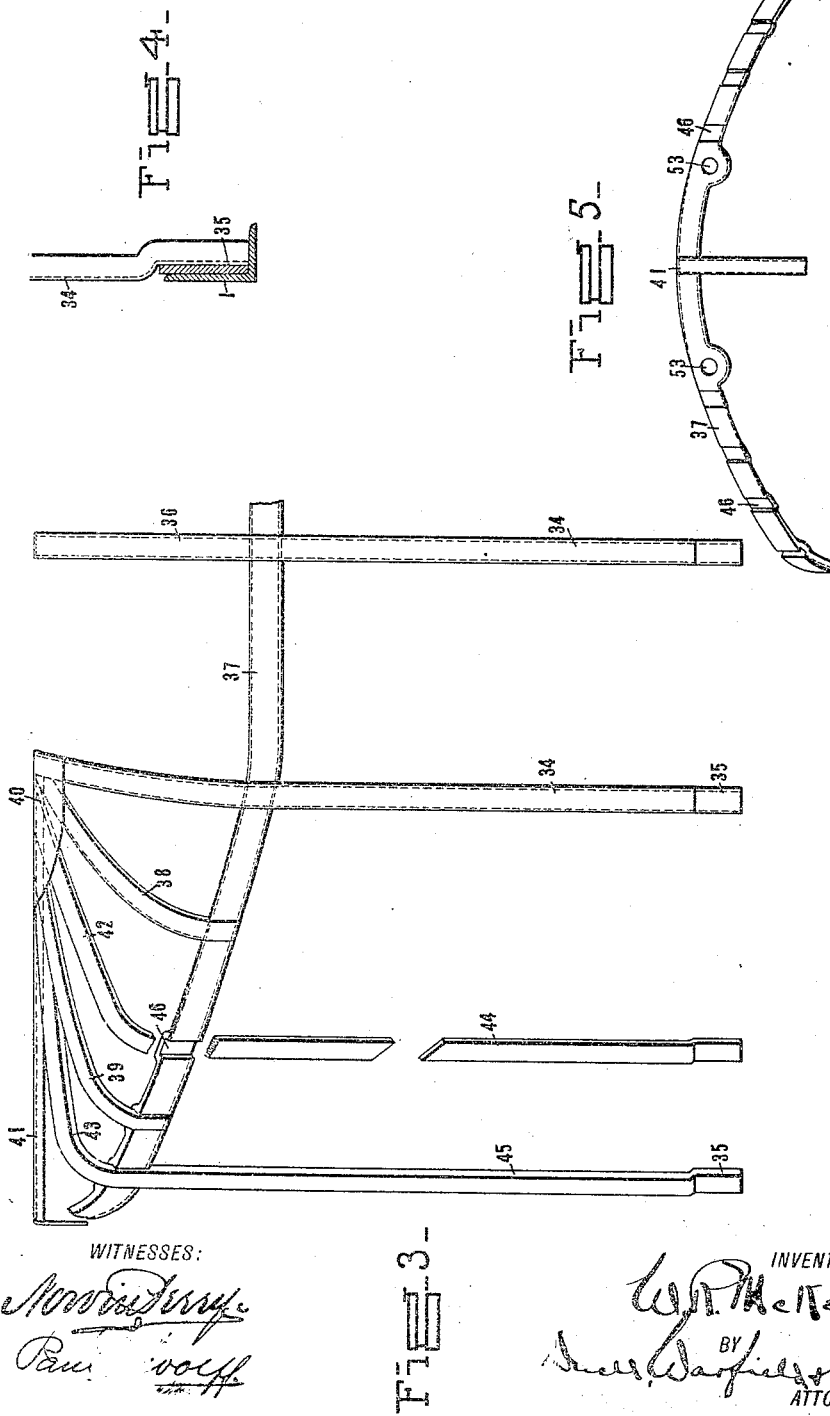

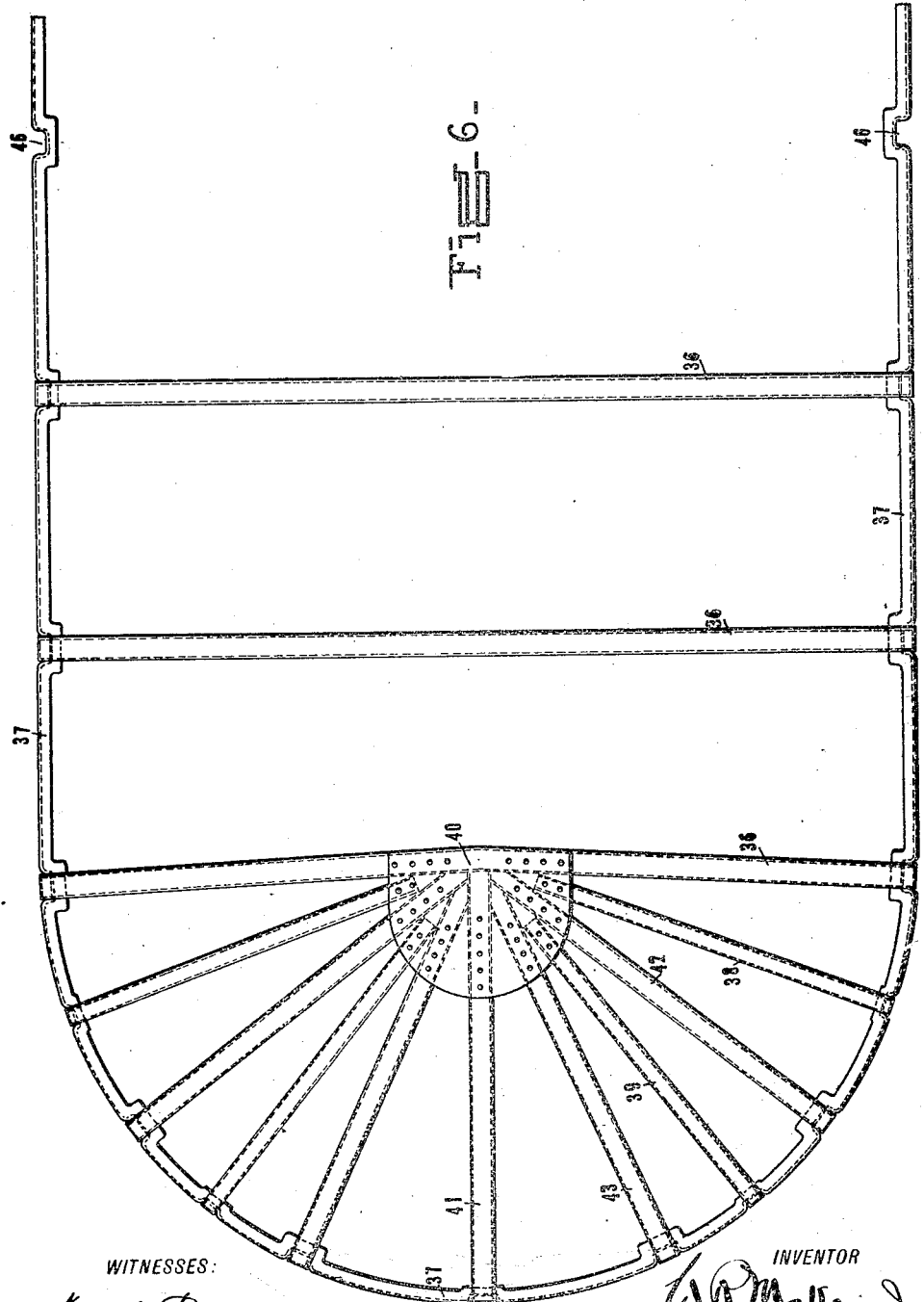

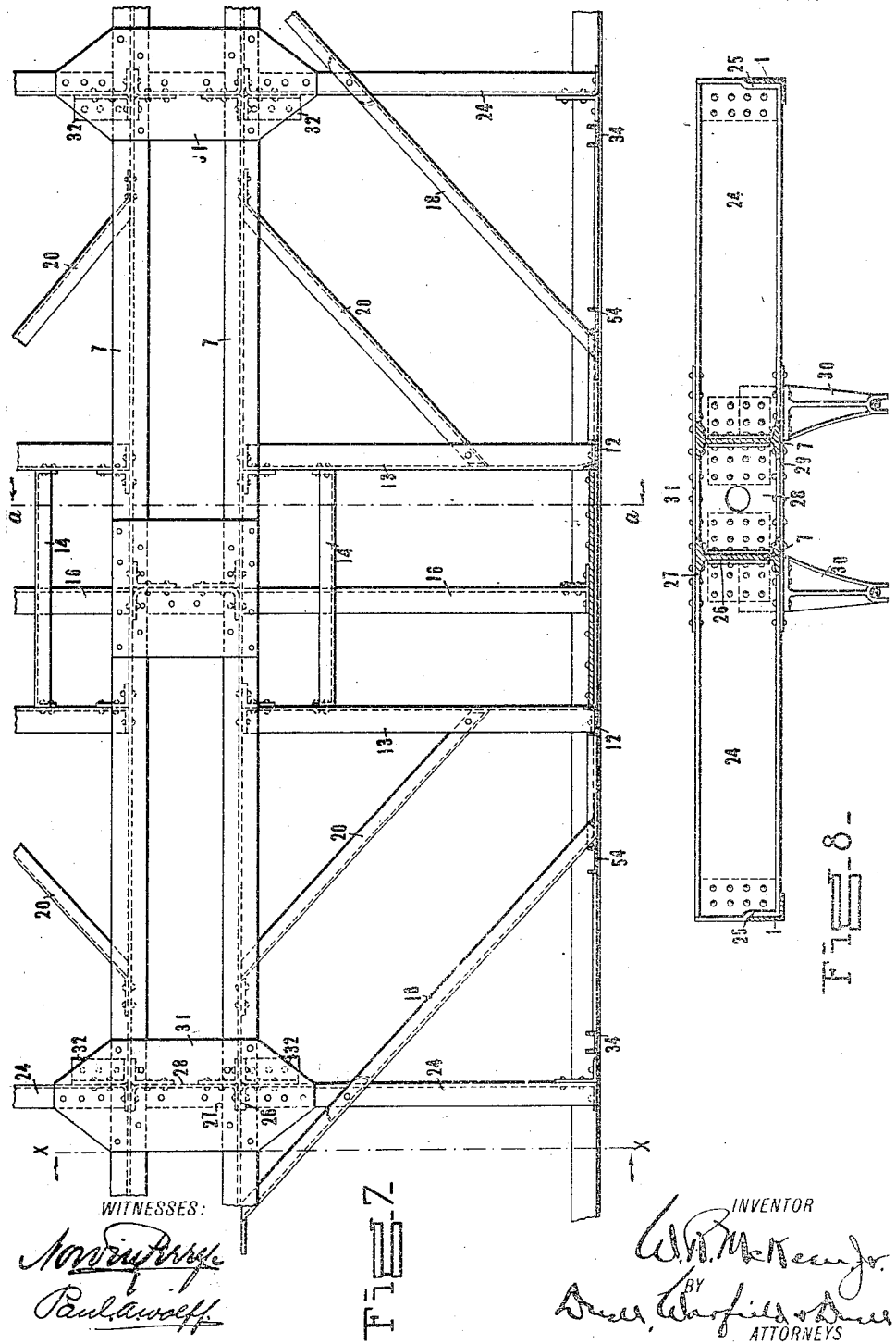

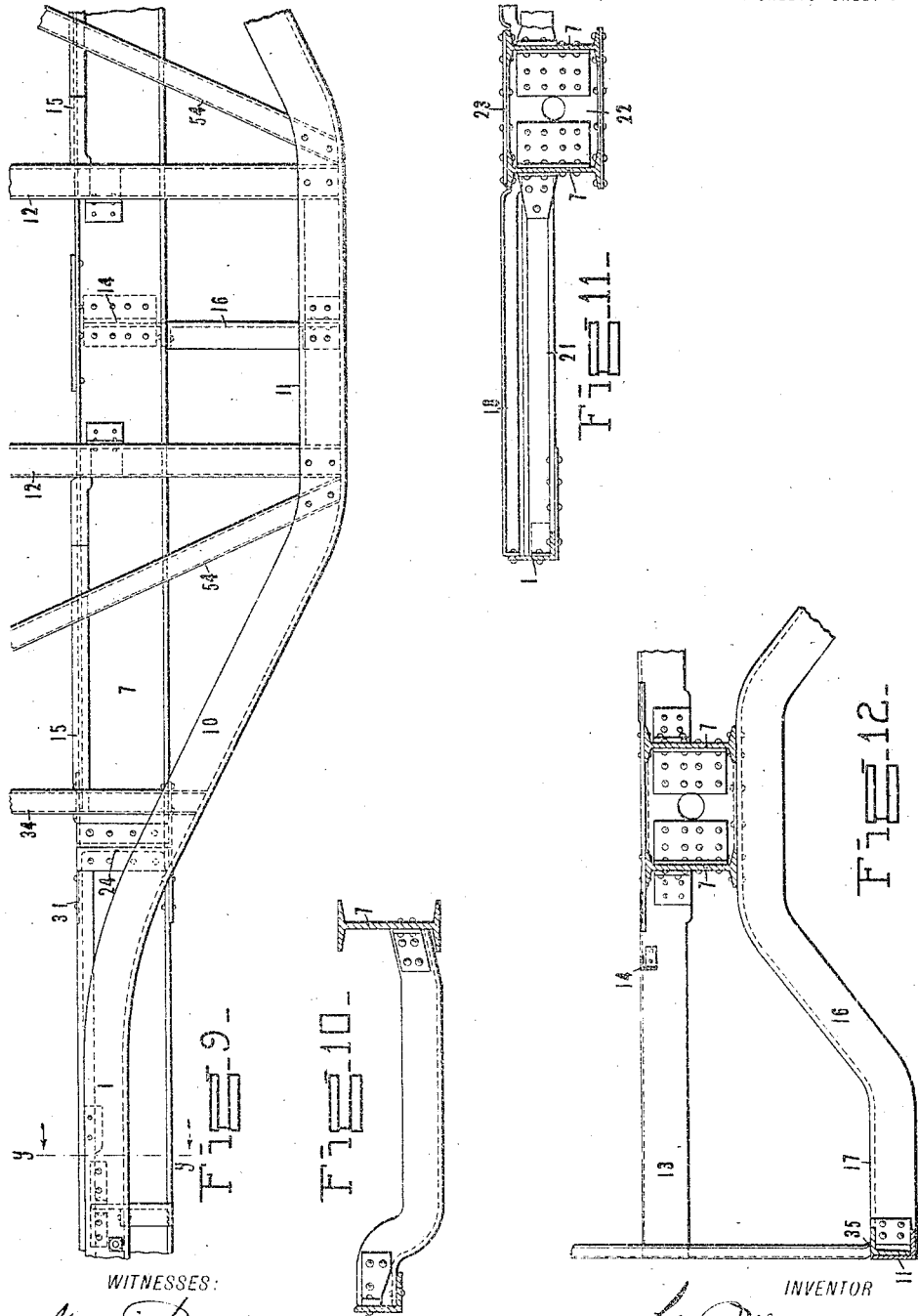

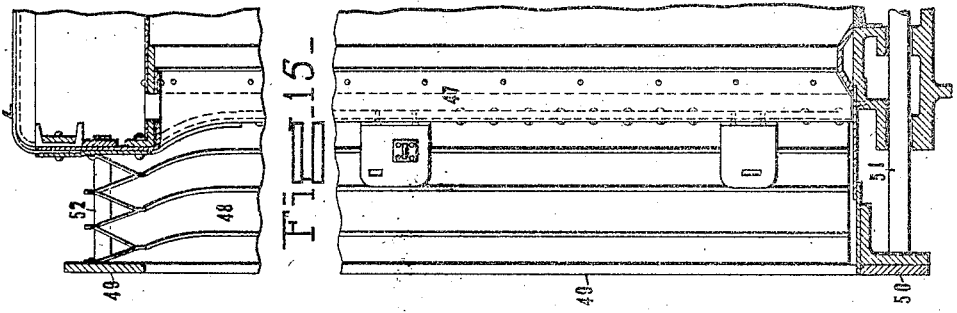
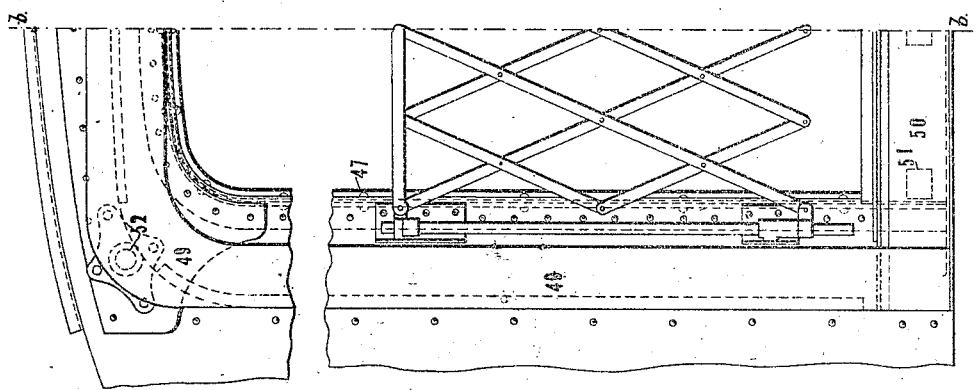
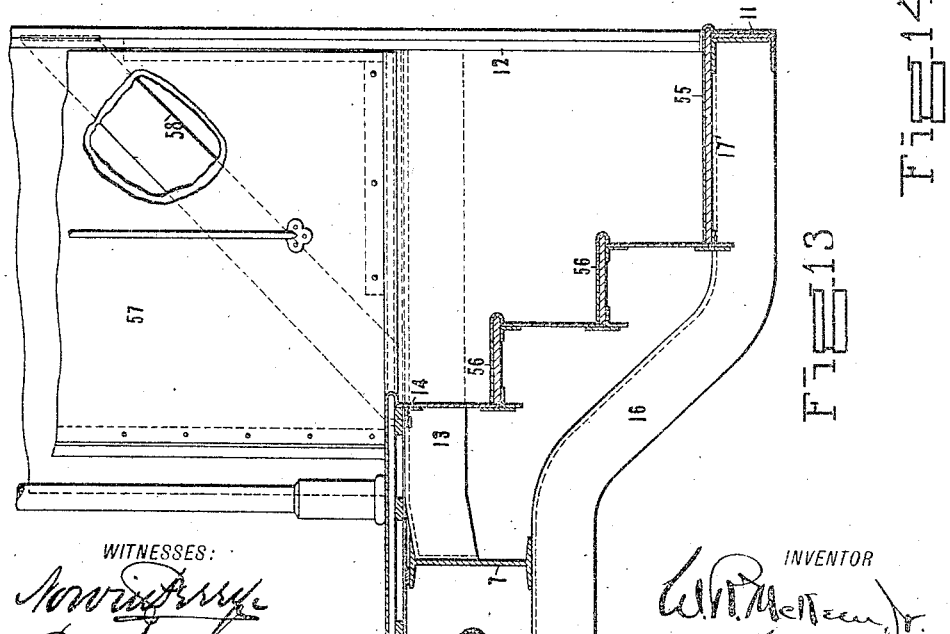

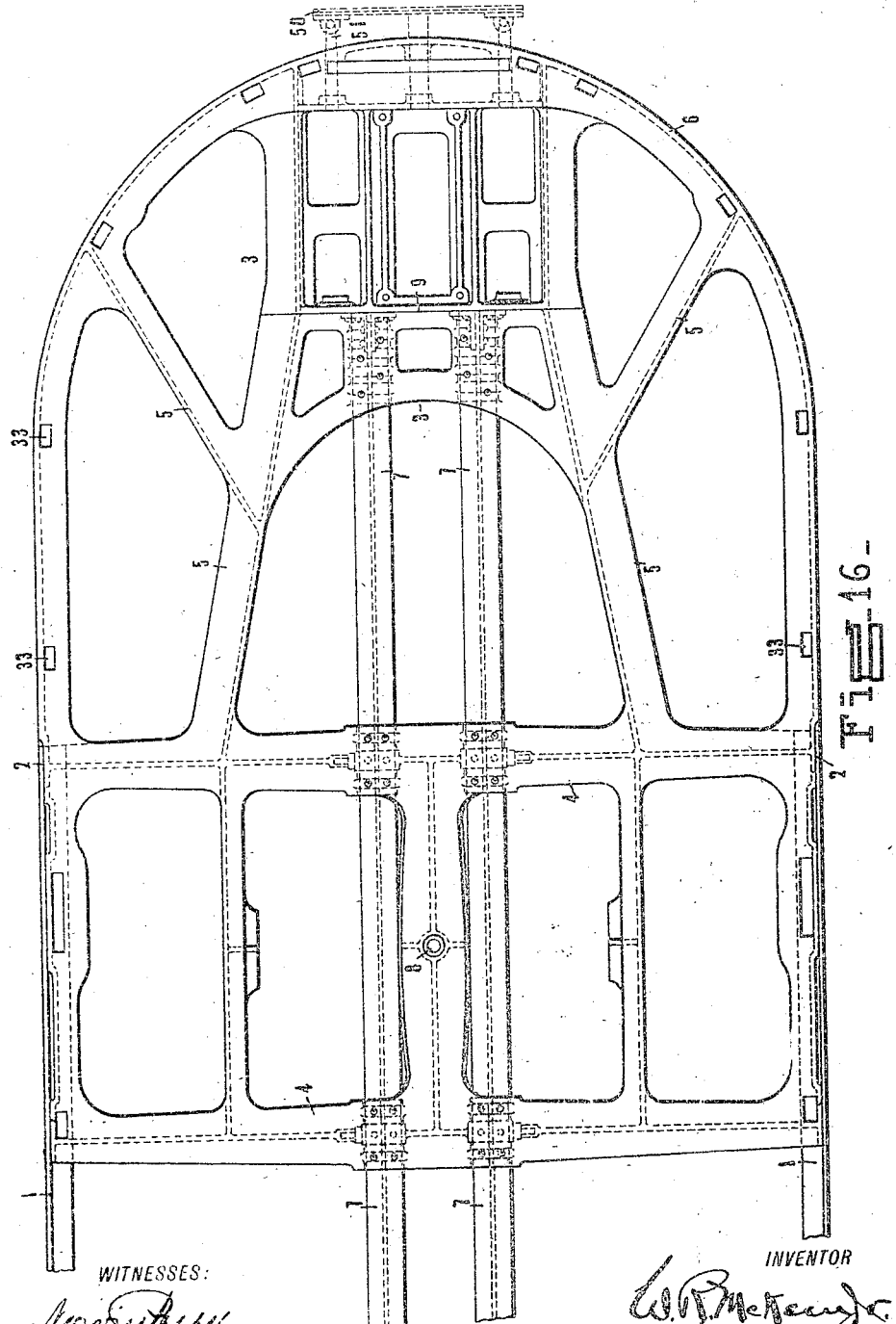

UNITED STATES PATENT OFFICE.

WILLIAM R. McKEEN, JR., OF OMAHA, NEBRASKA, ASSIGNOR TO McKEEN MOTOR CAR COMPANY, OF OMAHA, NEBRASKA, A CORPORATION OF NEW JERSEY.

STEEL-CAR CONSTRUCTION.

1,189,148.

Specification of Letters Patent.

Patented June 27, 1916.

Application filed November 9, 1909. Serial No. 526,986.

*To all whom it may concern:*

Be it known that I, WILLIAM R. MCKEEN, Jr., a citizen of the United States, residing at Omaha, in the county of Douglas and State of Nebraska, have invented certain new and useful Improvements in Steel-Car Construction, of which the following is a full, clear, and exact description, such as will enable others skilled in the art to which it appertains to make and use the same.

This invention relates to the construction of steel cars, and with regard to the more specific features thereof to the construction of steel passenger cars.

One of the objects thereof is to provide a light, rigid car body of simple and inexpensive construction.

Another object is to provide a car of the above nature formed to permit the ready entry and exit of passengers without loss of strength or stiffness in the frame.

Another object is to provide a car of the nature last described having a maximum seating capacity.

Another object is to provide a practical light-weight steel car having a low air resistance, and formed and constituted to resist all normal or abnormal stresses incident to its use.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
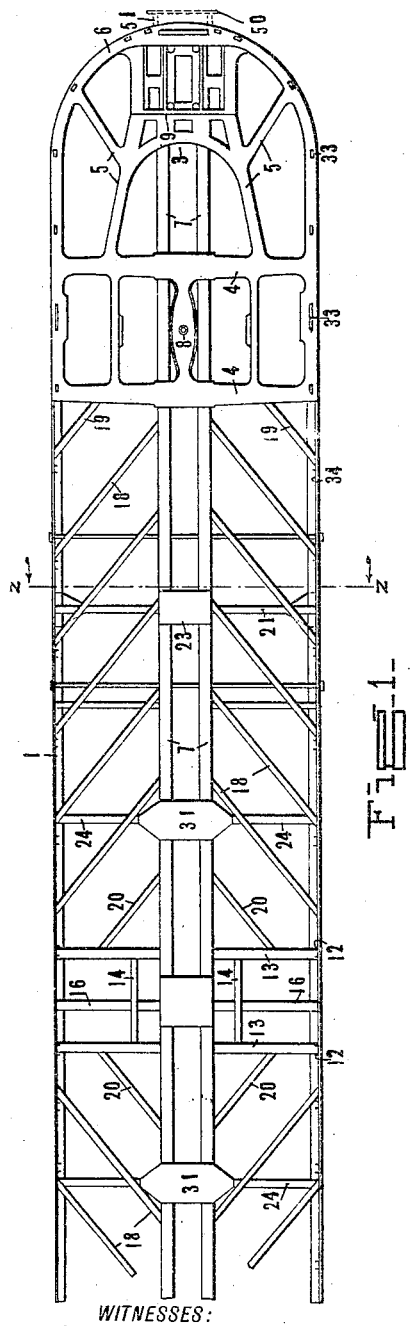
Figure 2:
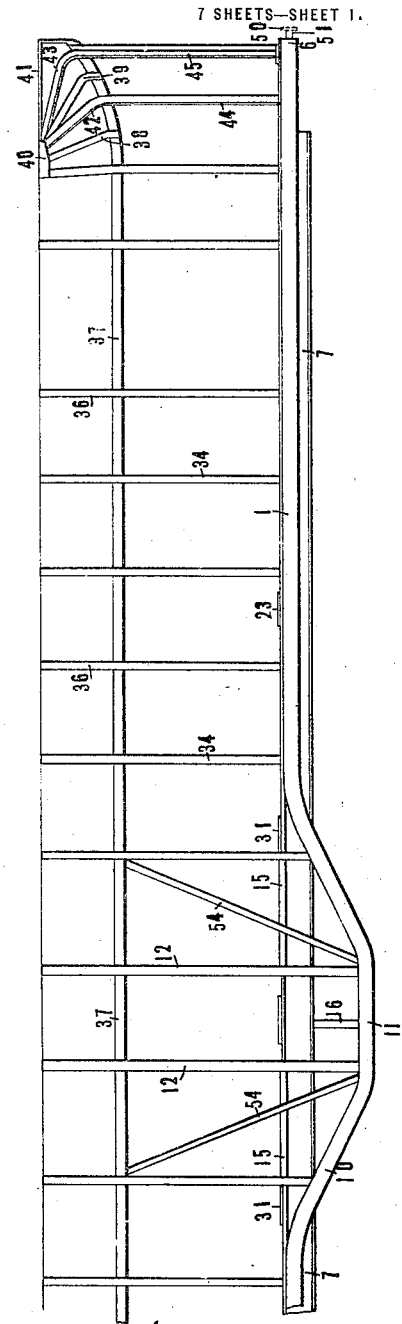

In the accompanying drawings, wherein is shown one of various possible embodiments of this invention, Figure 1 is a plan of the floor frame thereof; Fig. 2 is an elevation of the body framework; Fig. 3 is a similar view showing in detail the end construction of the body frame; Fig. 4 is a sectional view showing the method of connecting a post or upright to the sill; Fig. 5 is an end view showing in detail the upper side plate; Fig. 6 is a plan of the roof framing at one end of the car; Fig. 7 is a plan of a portion of the central floor framing of the car; Fig. 8 is a sectional view taken along the line *a—a* of Fig. 7; Fig. 9 is a detail elevation of a portion of the central framing of the car; Fig. 10 is a sectional view taken along the line *y—y* of Fig. 9; Fig. 11 is a sectional view taken along the line *z—z* of Fig. 1; Fig. 12 is a sectional view taken along the line *a—a* of Fig. 7; Fig. 13 is a central transverse section showing details of an entrance; Fig. 14 is an end view of a portion of an end of the car; Fig. 15 is a sectional view taken along the line *b—b* of Fig. 14; and Fig. 16 is a detail plan of the end floor framing of the car.

Similar reference characters refer to similar parts throughout the several views of the drawings.

In order to render clearer certain features of this invention, it may be here noted that in the large passenger traffic of many railroads it is found conducive to economy and efficiency of service to provide carrying units of a maximum capacity rather than a larger number of smaller cars. In the construction of cars, there are limits placed upon the dimensions, the width and height being limited by track conditions, and the necessity for preserving stability with a standard gage track, and the length being limited by curves and other considerations. In the common end construction of passenger cars, however, the platforms are not only a source of weakness but consume space and reduce the carrying capacity of the car. It may also be noted that the heaviest shocks to which railway rolling stock is subjected either in normal use, as in coupling, or abnormal, as in the case of a collision, are generally directed lengthwise of the car. The provision of a car which shall not only be peculiarly adapted to resist shocks of this nature, but which, with given external dimensions, shall provide a maximum seating capacity as well as strength and stiffness, is among the dominant aims of this invention.

Referring now to Figs. 1 and 16 of the drawings, there are shown the side sills 1 which rest at their ends within recesses 2 in a rigid integral casting 3 and are secured thereto. This casting comprises the double body bolster 4, bracing 5, and a peripheral portion 6 which forms in effect a continuation of the side sill, curving about the end of the car. It is to be understood that both ends of the car are substantially identical, one end only being shown in the drawings.

Disposed between the side sills 1 extending substantially from end to end of the car are a pair of heavy I-beam center sills 7 which pass each side of the king bolts 8 and abut against the casting 3 at 9.

Side sills 1 are each provided with a depressed portion 10, these portions being substantially opposite as indicated in the drawings. Each of these depressed portions comprises a substantially horizontal central portion 11 at each side of which uprights or posts 12 are secured. A pair of horizontal braces 13 lead from each of these pairs of uprights to the adjacent center sill, and these braces are connected one with another by braces 14. Also secured to each of the uprights 12 are longitudinal members 15 substantially registering in plan with the depressed portion of the side sill and connecting the uprights with the upper undepressed portion thereof. As a further brace and stiffener for the depressed portions of the sills and related frame members there is provided a heavy cross-beam 16, best shown in Fig. 12 of the drawings, which is of angle cross-section and secured beneath the center sills 7 resting at its ends within the angle side sills 1. This brace is provided with a horizontal portion 17 for a purpose hereinafter referred to.

Extending in symmetrical order from the center sills 7 are inclined struts or braces 18, these braces being oppositely directed at opposite ends of the car and disposed as a whole in general herring-bone conformation. Substantially parallel to these braces, which rest at their outer ends within the side sills 1, are braces 19, extending from the casting 3 to the side sills, and braces 20 extending from the center sills 7 to the cross-braces 13. These several inclined struts aid materially in diffusing to the side sills and thence to the entire car frame all shocks imposed upon the center sills in use, and contribute largely to the stiffness of the car.

Cross-braces or needle beams are provided at 21, as indicated in Fig. 11 of the drawings, extending from the side sills to the adjacent center sills, the upper surfaces of these members being substantially level one with another at this point, and the center sills are connected as by the webs 22 and plates 23 at a point in alinement with these beams. Additional transverse supports or cross bearers 59 are or may be extended from the center sills 7 to the side sills 1, as indicated in Figs. 1, 9 and 10. These cross bearers are preferably of angle iron or L-shaped in cross section, with the main web standing vertically and the flange horizontally, the ends being bent upwardly to rest upon the lower flange of the center sill 7, and upon the inwardly projecting flange of the outer sill 1, as shown in Fig. 10, angle plates being also riveted to the sills and the cross bearer to secure the parts together.

Referring now to Fig. 8, which shows the floor framing in cross-section at the point at which the lower surface of the angle side sill is substantially in the same plane with the lower surface of the I-beam center sills 7, the heavy cross-braces 24, which are of channel cross-section, rest upon the lower inwardly turned flanges of the side sills. The ends of braces 24 are so recessed, as at 25, as to receive the upright flanges of the side sills with the outer surfaces of both members substantially flush. At their inner ends the braces 24 are cut in such manner as to permit their webs to fit between the flanges of the I-beam center sills and abut against the same at 26, the flanges of the braces also abutting against the flanges of the center sills, as at 27. The I-beams 7 are connected one with another in alinement with the braces 24 by a web 28 stiffened by suitable angle plates, and beneath the inner ends of braces 24, I-beams 7, and web 28 is stretched a suitable plate or gusset 29. Resting with their bases against this plate and projecting partially under the center sills are a pair of queen-posts 30 adapted to receive and rest upon suitable truss-rods.

Suitable gussets 31 are provided as shown in Fig. 7 of the drawings, and angle plates 32 are provided at points at which the various members abut in order to diffuse the stresses more evenly.

Considering, now, the superstructure of the car, it is to be noted that the sill portions of the end castings are formed to provide recesses 33 within which are fitted and secured the posts or uprights 34. These posts are offset at their lower ends, as indicated at 35 in Figs. 3 and 4 of the drawings, in order to provide a smooth outer surface for the car, and are in general continued up and arched across the car to form roof ribs 36. The two posts or uprights 34 at opposite sides of the car and the intervening roof support, may be made in one integral piece, or they may be made in pairs each comprising one upright and a section of the arching roof support, and united at their meeting ends.

The upper side plate 37 is formed to extend continuously about the upper portion of the car, being curved or inclined upwardly at the ends to form a plate registering in plan with the end sill of the car. Extending in radial relation to this plate are roof ribs 38 and 39 which converge toward the end roof ribs 36 and are secured to a common gusset or plate 40. The central rib 41 extends substantially to the center of the plate 37 at the end of the car in horizontal form and the ribs 42 and 43 are continued downwardly to form end posts 44 and 45. The entire plate has stamped or otherwise formed therein the recesses 46 within which the several ribs and posts fit, in order that they may rest securely in position and provide a smooth outer surface for the car.

It may be noted at this point that inasmuch as both the sills and plate curve about the end of the car, the portion at the side of the car merges into that at the end, and hence there is no sharp line of demarcation, as in a car of the common type, between side sills and end sills, or side plates and end plates. For this reason the terms "side plate" and "side sill" are used throughout, unless otherwise limited, in a generic sense, as denoting an upper plate member or a sill member, irrespective of whether it is positioned at the side of the car or the end of the car or both.

It is to be understood that the entire frame is to be covered with sheathing of sheet metal, thus aiding in holding all of the frame members in position, and providing a structure which is light and stiff in the highest degree. It may also be noted at this point that by the horizontally arched ends both of the plate and sill, substantially registering in plan one with another and abutting against corresponding portions of the adjacent car, there is presented to the end shocks hereinbefore noted, an arched structure which, as is well known, is of great strength and stiffness. Moreover, if cars of this form be brought into violent contact the shock is imparted not only through the floor frame and thus to the superstructure, with a tendency to racking stresses, but is also brought to bear directly upon the superstructure through the curved plate and radial roof members, and thus evenly borne by the car as a unit.

By the construction hereinbefore set forth, wherein the upper side plate 37 is curved upwardly at and carried across the ends of the car, and the roof members are extended radially to meet the upwardly curved end portion of said plate, the middle roof member extends horizontally from end to end of the car, and affords a level or horizontal mid-roof support. This is of advantage in that it affords a practically unbroken platform throughout the train length, over which train men may pass from car to car, the rounded end formation permitting the car roofs to come and remain practically in contact at all times, and whether the cars be running on a straight or a curved track. The radial or diverging braces of the end portion of the roof add greatly to the strength thereof, and to the capacity of the car to withstand end stresses, said radial braces transmitting such stresses through the roof sheathing to the carlines, posts and sides. The upward curvature of the plate 37 across the ends of the car affords adequate head room for the door, even though the car as a whole be made comparatively low.

In the ordinary use of cars of this nature, their end doors 47 formed between the central end posts are provided with diaphragms 48, as indicated in Figs. 14 and 15, of the drawings, having face plates 49 terminating at the buffers 50. From the buffers 50 the buffer bars 51 pass through the sill, and from the upper portion of the face plate 49 bars 52 pass through integral guides formed in the plate 37, as at 53 in Fig. 5 of the drawings.

The entrance doors are formed upon the depressed portion of the side sills 1 between the uprights 12 and are braced by the members hereinbefore described as well as the inclined braces 54 extending from the sill to the plate. Upon the lower horizontal portion of the member 16 is formed a short platform 55 from which the stairs 56 lead upwardly to the car floor, a trap door 57 being provided if desired.

As seen in Fig. 12 of the drawings, a heavy inclined brace 58 extends from each horizontal member 13 to the corresponding upright 12. These braces, with the members which they connect, form rigid triangles, which in conjunction with the associated members, give a trussed formation possessing strength and stiffness in a high degree.

In the use of the car, the method by which the stresses are handled has already been outlined, but it may be noted and emphasized that the aim in view is to so relate all of the members that any shock or other stress, whether occurring in normal use or in collision will be diffused throughout the entire structure so that all parts may bear their proportion thereof and thus gain a maximum strength with a minimum of material. The end shocks which, as above noted, are the most severe, are met by the arched sill and transmitted not only directly to the heavy side sills which are substantially unweakened by the inclined depressed portions, but also through the I-beam center sills and thence spread throughout the structure by the cross-braces and diagonal braces, the latter acting as compressive elements, thus utilizing their maximum strength. The shocks are transmitted to the upper structure not only by the posts or studs securely fixed to the sills, but directly through the plate at its curved ends and are thus borne by the car as a whole. The rounded ends not only present arches to resist end shocks, but reduce air resistance and substantially eliminate the chance of the cars telescoping in collision. The side entrances permit convenient passage to and from the car without weakening the same or unduly consuming floor space, and the end entrances permit passage throughout the train without the weak and cumbersome platform construction now in general use.

In speaking of the car as having an evenly curved end, I mean that the end joins the sides in a regular curve, and is without sharp bend or angle at any point. In practice, the end is preferably of semicircular form, but in any event is without angles or short bends of any kind. In this respect it differs from the car shown and described in my former Patent No. 809,974, dated January 16, 1906, the extreme end of which was perpendicular to the longitudinal axis of the car.

The entire car is preferably built of structural steel, shapes of well known cross-section being in general employed, thus reducing the cost of construction and gaining the lightness and stiffness which members of this character have been proved to possess from broad practical use in other relations.

It will thus be seen that there is provided a car in which the objects of this invention are achieved and the advantages herein noted are gained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. In steel car construction, in combination, an upper side plate upwardly inclined toward the end of the car, and a plurality of radiating roof members extending downwardly toward and secured to said plate.

2. In steel car construction, in combination, an upper side plate upwardly inclined toward the end of the car, and a plurality of roof members curved toward and secured to said side plate, said roof members being inclined toward one another and connected one with another at their converging ends.

3. In steel car construction, in combination, an upper side plate horizontal throughout substantially the length of the car and inclined upwardly at its ends, and a plurality of roof members extending downwardly toward and secured to said side plate, said roof members being secured in diverging relation toward the inclined portion of said plate.

4. In steel car construction, in combination, an upper side plate horizontal throughout substantially the length of the car, and curved upwardly across the ends of the car; and a roof member at each end of the car extending horizontally to a point directly above the highest point of said plate, and thence turned downward and joined to said plate.

5. In steel car construction, in combination, an upper side plate curved about the end of the car and upwardly inclined toward the end, and a plurality of roof members diverging toward and secured to the curved portion of said plate.

6. In steel car construction, in combination, an upper side plate horizontal throughout substantially the length of the car and inclined upwardly at each end and curved about the ends of the car, and a plurality of roof members secured to said plate, said roof members being disposed to diverge one from another toward their points of connection with said plate.

7. In steel car construction, in combination, a metallic upper side plate bent to form recesses; and metallic roof members fitted within said recesses.

8. In steel car construction, in combination, an upper side plate having portions offset to form recesses and roof members fitted within said recesses.

9. In steel car construction, in combination, a metallic upper side plate bent to form recesses; and metallic upright side frame members resting within said recesses.

10. In steel car construction, in combination, a car sill bent to form recesses, and upright side frame members fitted within said recesses.

11. In steel car construction, in combination, a metallic upper side plate and sill, each bent to form recesses substantially registering one with another; and metallic upright side members fitted within said recesses.

12. In steel car construction, in combination, a metallic upper side plate and sill, each bent to form recesses substantially registering one with another; and metallic upright side members fitted within said recesses, said side members being continued above said sill to form roof ribs for the car.

13. In steel car construction, in combination, a sill curved around the end of a car, and an upper side plate inclined upwardly and curved to substantially register in plan with said sill.

14. In steel car construction, in combination, a sill curved about the end of the car, an upper side plate curved upwardly at the end and curved to substantially register in plan with said sill, and uprights connecting said curved portions of said sill and said side plate one with another.

15. In steel car construction, in combination, a metallic sill curved about the end of the car; a metallic upper side plate curved upwardly at the end, and curved to substantially register in plan with said sill; and metallic uprights connecting said curved portions of said sill and said side plate one with another, said uprights resting within recesses formed in said sill and said side plate.

16. In steel car construction, in combination, a metallic upper side plate formed to provide recesses, and upwardly inclined toward the end of the car; and a plurality of metallic roof members extending to said side plate and fitted within said recesses.

17. In steel car construction, in combination, a metallic upper side plate curved about the end of the car and bent to form recesses; and a plurality of metallic roof members extending to said side plate and fitted within said recesses.

18. In steel car construction, in combination, a sill formed to provide recesses, an upper side plate upwardly inclined at a point above said sill and formed to provide recesses, upright side frame members connecting said side plate with said sill and resting in said recesses, and a plurality of roof members extending to the inclined portion of said side plate and fitted within the recesses therein.

19. In steel car construction, in combination, a sill curved about the end of the car, an upper side plate inclined upwardly and curved to substantially register in plan with said sill, uprights connecting said sill and said side plate one with another, and roof members extending to said inclined portion of said side plate.

20. In steel car construction, in combination, a sill curved about the end of the car, an upper side plate inclined upwardly and curved to substantially register in plan with said sill, uprights connecting said sill and said side plate one with another, and roof members extending to said inclined portion of said plate, said sill and said plate being formed to provide recesses within which said uprights and said roof members rest.

21. A steel car frame having evenly curved ends, and a roof uniformly curved throughout to meet the side walls and ends, said roof being in the form of a segment of a cylinder, and the mid-portion thereof extending in a continuous horizontal line from one extremity to the other.

22. A steel car frame formed to provide evenly curved ends; a roof uniformly curved throughout to meet said ends, said roof having a cylindrical surface throughout with respect to a horizontal axis; and a door-frame in the end of and strengthening said car frame.

23. A steel car frame comprising a sill and a side-plate, each carried about the car and fashioned to produce uniformly curved ends; door-frames extending between the sill and side-plate at each end of the car, and strengthening said car frame; and a roof of substantially cylindrical form in cross section and uniformly curved throughout to meet the curved ends of the car.

24. In a steel car frame, an end frame uniformly curved about a vertical axis, and comprising a door-frame which bridges the doorway and ties together the portions of the end frame on either side thereof, and a roof uniformly curved to join with and conform to the curved end frame.

25. In steel car construction, in combination, a pair of side sills having substantially registering depressed portions, a center sill, a cross member extending from said center sill to each of said depressed portions and formed to provide a substantially horizontal portion at its lower ends, a pair of uprights mounted upon each of said depressed portions, and horizontal braces extending inwardly toward said center sill from each of said uprights.

26. In steel car construction, in combination, a side sill having an inclined portion, a center sill of greater depth than said side sill, a cross member from said center sill to said side sill substantially at a point at which the lower surface of said side sill is level with the lower surface of said center sill, and a cross member extending between said sills at a point at which the upper surface of said side sill is substantially level with the upper surface of said center sill.

27. In steel car construction, in combination, a side sill having a depressed portion, a pair of uprights extending from said depressed portion of said side sill, a center sill, horizontal members extending from said center sill to said uprights, and inclined braces extending from said center sill to said horizontal members.

28. In steel car construction, in combination, a pair of side sills having substantially registering depressed portions, a pair of uprights extending from each of said depressed portions, a pair of center sills, a pair of horizontal members extending from said center sills to each of the corresponding pairs of uprights, and inclined braces extending from said center sills to each of said horizontal members.

29. In steel car construction, in combination, a pair of side sills having substantially registering depressed portions, a pair of uprights extending from each of said depressed portions, a pair of center sills, a pair of horizontal members extending from said center sills to each of the corresponding pairs of uprights, inclined braces extending from said center sills to each of said horizontal members, and a brace extending from each center sill to said depressed portions of said side sills.

30. In steel car construction, in combination, a pair of side sills having substantially registering depressed portions, a pair of uprights extending from each of said depressed portions, a pair of center sills, a pair of horizontal members extending from said center sills to each of the corresponding pairs of uprights, inclined braces extending from said center sills to each of said horizontal members, braces extending from each of said center sills to the depressed portion of the corresponding side sills, and stairs leading from said depressed portions into the car.

31. In steel car construction, in combination, a pair of side sills having substantially registering depressed portions; a pair of center sills adapted to receive the thrust and draft stresses; and inclined bracing members of general herringbone arrangement extending from the center sills to the side sills.

32. In steel car construction, in combination, a pair of side sills having substantially registering depressed portions; center sills extending longitudinally of the car, and adapted to receive the thrust and draft stresses; and inclined bracing members of general herringbone arrangement extending from the center sills to the side sills, and inclined in reverse directions at opposite ends of the car.

33. In steel car construction, in combination, a pair of side sills having substantially registering depressed portions; center sills extending longitudinally of the car, and adapted to receive the thrust and draft stresses; inclined bracing members of substantially herringbone arrangement extending from the center sills to the side sills; and a cast end frame to which said center and side sills are secured.

34. In steel car construction, in combination, a pair of side sills having substantially registering depressed portions; center sills extending longitudinally of the car, and adapted to receive the thrust and draft stresses; inclined bracing members of substantially herringbone arrangement extending from the center sills to the side sills, said bracing members being reversely inclined at opposite ends of the car; and a cast end frame to which said center and side sills are secured.

35. In steel car construction, in combination, a pair of side sills; a pair of center sills; substantially parallel inclined braces extending from each center sill to the adjacent side sill; and a cast end frame to which said center sills and said side sills are secured.

36. In steel car construction, in combination, a side sill provided with a depressed portion, a center sill, a pair of uprights extending from said depressed portion of said side sill, a pair of horizontal members extending from said center sill respectively to said uprights, a pair of inclined braces extending from said horizontal members upwardly to said uprights, and a pair of inclined braces extending from said center sill respectively to said horizontal members.

37. In steel car construction, in combination, a side sill provided with a depressed portion, a center sill, a pair of uprights extending from said depressed portion of said side sill, a pair of horizontal members extending from said center sill respectively to said uprights, a pair of inclined braces extending from said horizontal members upwardly to said uprights, a pair of inclined braces extending from said center sill respectively to said horizontal members, and a brace extending downwardly from said center sill to said depressed portion of said side sill.

In testimony whereof I affix my signature, in the presence of two witnesses.

WILLIAM R. McKEEN, Jr.

Witnesses:
FRANK J. JUMPER,
W. DEAN BURTON.